United States Patent Office 3,847,938
Patented Nov. 12, 1974

3,847,938
BENZENE-SULFONYL SEMICARBAZIDES AND PROCESS FOR PREPARING THEM
Helmut Weber, Frankfurt am Main, Walter Aumüller, Kelkheim, Taunus, Rudi Weyer, Frankfurt am Main, Karl Muth, Kelkheim, Taunus, and Kurt Stach, Mannheim-Waldhof, Germany, assignors to Farbwerke Hoechst Aktiengesellschaft vormals Meister Lucius & Bruning, Frankfurt am Main, Germany
No Drawing. Original application Aug. 7, 1968, Ser. No. 750,747, now Patent No. 3,705,151, dated Dec. 5, 1972. Divided and this application June 2, 1972, Ser. No. 259,299
Claims priority, application Germany, Aug. 12, 1967, F 53,221
Int. Cl. C07d 27/48
U.S. Cl. 260—326.1                                          4 Claims

ABSTRACT OF THE DISCLOSURE

Benzene-sulfonyl semicarbazides having hypoglycemic properties and corresponding to the general formula

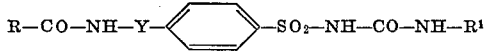

wherein

R represents
  (a) phenyl which may be substituted once or twice by substituents of the group lower alkyl, alkenyl, alkoxy, alkenoxy, alkoxyalkoxy, acyl, halogen, or trifluoromethyl, or by the methylene-dioxy group,
  (b) thienyl which may be substituted once or twice by substituents of the group halogen, lower alkyl, alkoxy, alkenyloxy, alkoxyalkoxy, phenalkoxy or aryl, or by a polymethylene chain linked at its two ends to the thienyl group, which chain contains from 3 to 4 carbon atoms;
Y represents —$CH_2$—$CH_2$—, —$CH_2$—CH—($CH_3$)— or —CH($CH_3$)—$CH_2$;
$R^1$ represents a hexahydro-iso-indoline, a tetrahydro-iso-indoline, a 4,7-endoalkylene-hexahydro-iso-indoline or a 4,7-endoalkylene-tetrahydro-iso-indoline, having 1 to 2 carbon atoms in the endoalkylene group, in the case of tetrahydro-compounds the double linkage being in 5,6-position; an iso-indoline, an indoline, a hexahydro-indoline, a tetra- or decahydro-quinoline, a tetra- or decahydro-iso-quinoline; 4,7-endocyclobutylene-hexahydro-iso-indoline; 4,7-endocyclobutylene-$\Delta^5$-tetrahydro-iso-indoline; 4,7-endocyclopropylene-$\Delta^5$-tetrahydro-iso-indoline; or 4,7-endocyclopropenylene-hexahydro-iso-indoline; and salts thereof.

---

This is a division of application Ser. No. 750,747, filed Aug. 7, 1968, now U.S. Pat. 3,705,151, issued Dec. 5, 1972.

The present invention provides benzene-sulfonyl semicarbazides of the formula and definition set forth in the Abstract. The new semicarbazides and their salts are valuable medicinal agents distinguished by a strong and particularly long-lasting blood-sugar lowering activity.

The term "lower" always characterizes groups or radicals having 1 to 4 carbon atoms. There are especially preferable compounds wherein R represents a phenyl group substituted in 2-position by lower alkoxy- or alkenoxy and in 4- or 5-position by a halogen atom or by a lower alkyl or alkoxy.

The present invention further relates to a process for preparing said benzenesulfonyl semicarbazides. As methods for preparation, there may be mentioned the following methods:
  (a) Reaction of R—CO—NH—Y-substituted benzenesulfonamides, preferably in the form of their salts, with imino-carbamic acid esters, imino-thiocarbamic acid esters, or imino-ureas containing as imino radical the group $R^1$—,
  (b) Reaction of hydrazines of the formula $R^1$—$NH_2$ or their salts with R—CO—NH—Y-substituted benzenesulfonyl isocyanates, benzenesulfonyl carbamic acid esters, benzenesulfonyl thiolcarbamic acid esters, carbamic acid halides or ureas,
  (c) Reaction of R—CO—NH—Y-substituted benzene-sulfo-chlorides with $R^1$-substituted ureas or preferably with their salts,
  (d) Hydrolysis of benzenesulfonyl-isosemicarbazide ethers, isothiosemicarbazide ethers or benzenesulfonyl-imino-parabanic acids,
  (e) Exchange of the sulfur atom for an oxygen atom, in benzenesulfonyl thiosemicarbazides of the formula

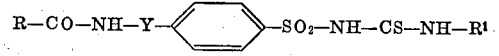

(f) Introduction of the radical R—CO—, if desired in one or several steps, into benzenesulfonyl semicarbazides of the formula

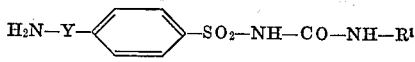

by acylation.

The benzenesulfonyl semicarbazides obtained may then be converted, if desired, into their salts by treatment with alkaline agents or with physiologically tolerable inorganic or organic acids.

As semicarbazides or imino-ureas for the syntheses mentioned under (a), there are suitable compounds of the formula $R^1$—NH—CO—$NH_2$ or acylated compounds of the formula $R^1$—NH—CO—NH—acyl, wherein acyl represents an aliphatic or aromatic acid radical, preferably of lower molecular weight, or diphenyl semicarbazides of the formula $R^1$—NH—CO—N($C_6H_5$)$_2$, wherein the phenyl radicals may be substituted or may be linked to each other directly or by means of a bridge member such as —$CH_2$—, —NH—, —O— or —S—, or N,N'-disubstituted carbohydrazides of the formula $R^1$—NH—CO—NH—$R^1$.

Especially suitable as benzenesulfonyl carbamic acid halides are the chlorides.

Furthermore, corresponding benzenesulfonyl ureas which may be unsubstituted at the terminal nitrogen atom, or substituted once or twice by alkyl or aryl groups, may be converted into the final products by reacting these with hydrazines of the formula $R^1$—$NH_2$, if desired, in the form of their salts. Instead of the benzenesulfonyl ureas substituted in this manner, there may be used the corresponding N-benzenesulfonyl-N'-acyl ureas, benzene-sulfonyl - carbamoyl-imidazols, benzenesulfonyl-carbamoyl-pyrazols or benzene-sulfonyl-carbamoyl-triazols or bis-(benzenesulfonyl)-ureas which carry at one of the nitrogen atoms another substituent, for example methyl. Such bis-(benzenesulfonyl)-ureas or N-benzene-sulfonyl-N'-acyl-ureas may be treated with hydrazines of the formula $R^1$—$NH_2$ and the salts obtained may be heated to elevated temperatures, preferably to at least 80° C.

The imino-carbamic acid esters or benzenesulfonyl carbamic acid esters mentioned, as well as the corresponding thioesters, contain in the ester component preferably an alkyl radical of low molecular weight or a phenyl radical.

The benzenesulfonyl isosemicarbazide ethers, -isothiosemicarbazide ethers or -parabanic acids, used as starting materials, may be obtained by reacting corresponding isosemicarbazide ethers, isothiosemicarbazide ethers or parabanic acids with corresponding benzenesulfochlorides. Benzenesulfonyl isosemicarbazide ethers are also obtained, in the first place, by desulfurizing benzenesulfonyl thiosemicarbazides in methanol. They are subsequently converted into benzenesulfonyl semicarbazides by hydrolysis.

Depending on the nature of the member R—CO—, in some cases, the one or the other of the previously described methods may prove unsuitable for preparing the individual compounds falling under the general formula, or at least will make it necessary for active groups to be protected. Such relatively rare cases can easily be recognized by the expert, and their is no difficulty in successfully applying another one of the syntheses described.

As regards the reaction conditions, the process embodiments of the present invention may in general, vary within wide limits and may be adapted to each individual case. For example, the reactions can be effected with the use of solvents, at room temperature or at an elevated temperature.

As starting substances there are used, as one reactant, compounds containing a benzene radical substituted by the group R—CO—NH—Y—. As radical R may be mentioned, for example, the following groups:

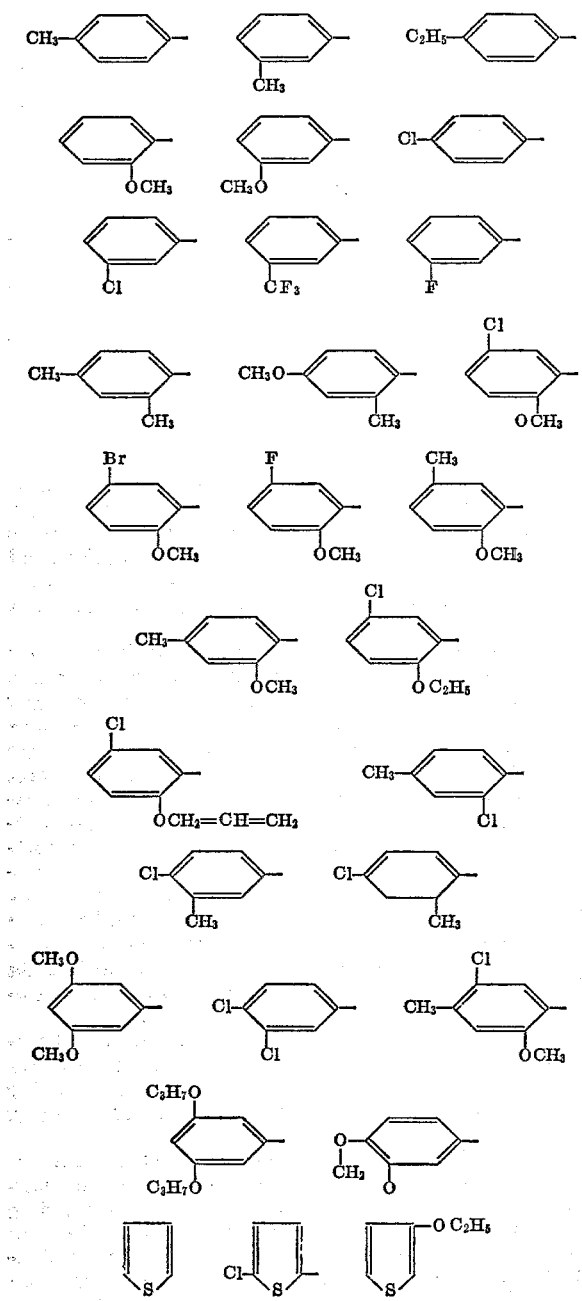

$R^1$ may represent, for example:

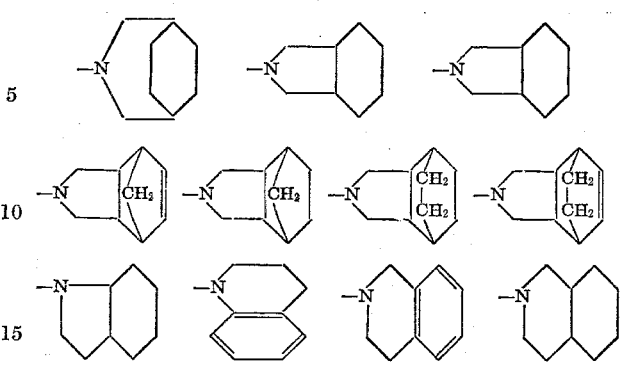

The sulfonyl-semicarbazide derivatives obtainable according to the present invention, are valuable medicinal agents which are distinguished by a strong action of lowering the blood sugar level. This applies, in particular, to such compounds in which R represents a phenyl radical carrying an alkoxy group in 2-position. The blood sugar lowering action of the products of the invention could be ascertained, for example, in rabbits, by administering the compounds in a dose of 10 mg./kg. and by determining the blood sugar value, over a prolonged period of time, according to the known method of Hagedorn-Jensen. The following table comprises the blood sugar lowering activities of some of the compounds obtained according to the process of the present invention:

TABLE

| Compound | Lowering of the blood sugar level in rabbits after administering 10 mg./kg. per os after— | | Limit amount causing lowering of the blood sugar level in rabbits, mg./kg. |
|---|---|---|---|
| | 3 hours | 24 hours | |
| N-[4-(β-<2-methoxy-5-chlorobenzamido>-ethyl)-benzenesulfonyl]-1,1-(2,5-endoethylenehexamethylene)-semicarbazide. | 36% | 31% | 0.1 |
| 4-[4-(β-<2-methoxy-5-methylbenzamido>-ethyl)-benzenesulfonyl]-1,1-(2,5-endoethylenehexamethylene)-semicarbazide. | 14% | 24% | 0.06 |

In contradistinction thereto, the [N-(4-methylbenzenesulfonyl)-N'-n-butyl-urea] known as antidiabetic and used as medicinal agents shows no lowering of the blood sugar level when administered in a dose of 25 mg./kg. in a comparative test.

The toxicities of the products of the invention are very low, they are within the range of the above-mentioned N-(4 - methyl-benzenesulfonyl)N'-n-butyl-urea which is very well tolerable.

It is preferable to process the products of the present invention into orally administerable preparations which have blood sugar lowering action and which can accordingly be used in the treatment of diabetes mellitus; these can be employed as such or in the form of their salts or in the presence of substances causing salt formation. For such salt formation there can be used, for example, alkaline agents such as alkali metal hydroxides, alkaline earth metal hydroxides, alkali metal carbonates, alkaline earth metal carbonates, alkali metal bicarbonates and alkaline earth metal bicarbonates or physiologically tolerated acids. The pharmaceutical preparations are preferably in the form of tablets which contain, in addition to the compounds of the present invention, the usual adjuvants and carriers such as talc, starch, lactose, tragacanth, magnesium stearate and the like.

The following examples serve to illustrate the present invention, but these are not intended to limit it thereto:

EXAMPLE 1

4 - [4 - (β-<2 - methoxy-5-chlorobenzamino>-ethyl)-benzenesulfonyl] - 1,1 - (2,5 - endoethylene-hexamethylene)-semicarbazide 4.2 grams of N-[4-(β<2-methoxy-5-chlorobenzamido>-ethyl)-benzenesulfonyl]-methyl-urethane (melting point 189–191° C.) were suspended in 75 milliliters of dioxane and 1.6 grams of 1,1-(2,5-endoethylene-hexamethylene)-hydrazine were added thereto. The mixture was heated to 110° C. for 1 hour, after cooling it was precipitated by adding water and the 4-[4-(β-<2-methoxy-5-chlorobenzamido>-ethyl)-benzenesulfonyl] - 1,1-(2,5-endoethylene-hexamethylene)-semicarbazide obtained was purified by reprecipitating it with dilute ammonia/glacial acetic acid and recrystallization from methanol (melting point 173–175° C.).

In an analogous manner there were obtained:

from N - [4-(β-<3-trifluoromethyl-benzamido>-ethyl)-benzenesulfonyl]-methylurethane (melting point 178–180° C.) 4 - [4 - (β-<3-trifluoromethylbenzamido>-ethyl)-benzenesulfonyl]-1.1 - (2.5 - endoethylene-hexamethylene)-semicarbazide of the melting point 193–195° C. (from methanol);

from N - [4 - (β-<3-chlorobenzamido>-ethyl)-benzenesulfonyl]-methyl-urethane (melting point 173–175° C.) 4 - [4 - (β-<3 - chlorobenzamido>-ethyl)-benzenesulfonyl] - 1.1 - (2.5 - endoethylene-hexamethylene)-semicarbazide of the melting point 198–200° C. (from methanol/dimethylformamide);

from N - [4-(β-<3-methoxythiophene-2-carbonamido>-ethyl)-benzenesulfonyl]-methylurethane (melting point 226–228° C.) 4 - [4 - (β-<3 - methoxythiophene-2-carbonamido>-ethyl)-benzenesulfonyl] - 1.1 - (2.5-endoethylenehexamethylene) - semicarbazide, melting point 166–168° C. (from methanol);

from N - [4 - (β-<3.4 - dichlorobenzamido>-ethyl)-benzenesulfonyl]methylurethane (melting point 198–200° C.) 4 - [4 - (β-<3.4-dichlorobenzamido>-ethyl)-benzenesulfonyl] - 1.1 (2.5-endoethylene-hexamethylene)-semicarbazide, melting point 178–180° C. (from methanol/dimethylformamide);

from N-[4-(β-<3.5-dimethylthiophene-2-carbonamido>-ethyl)-benzenesulfonyl]-methylurethane (melting point 170–172° C.) 4 - [4 - (β-<3-5-dimethylthiophene-2-carbonamido>-ethyl)-benzenesulfonyl] - 1.1(2.5-endoethylene-hexamethylene)-semicarbazide, melting point 184–186° C. (from methanol);

from N-[4-(β-<2-methoxybenzamido>-ethyl)-benzenesulfonyl]-methylurethane (melting point 174–176° C.) 4 - [4 - (β-<2-methoxybenzamido>-ethyl)-benzenesulfonyl] - 1.1 - (2.5 - endoethylene-hexamethylene)-semicarbazide, melting point 150–152° C. (from methanol);

from N-[4-(β-<2-methoxy-5-methyl-benzamido>-ethyl)-benzenesulfonyl]-methylurethane (melting point 175–177° C.) 4 - [4-(β-<2-methoxy-5-methylbenzamido>-ethyl)-benzenesulfonyl] - 1.1 - (2.5 - endoethylene-hexamethylene)-semicarbazide, melting point 166–168° C. (from methanol);

from N-[4-(β-<2-methoxy-5-bromo-benzamido>-ethyl)-benzenesulfonyl]-methylurethane (melting point 197–199° C.) 4 - [4 - (β-<2-methoxy-5-bromobenzamido>-ethyl)-benzenesulfonyl] - 1.1 - (2.5 - endoethylene-hexamethylene)semicarbazide, melting point 185–187° C. (from methanol);

from N-[4-(β-<2-ethoxy - 5 - chlorobenzamido>-ethyl)-benzenesulfonyl]-methylurethane (melting point 203–205° C.) 4-[4-(β-<2-ethoxy-5-chlorobenzamido>-ethyl) - benzenesulfonyl] - 1.1 - (2.5 - endoethylene-hexamethylene)-semicarbazide, melting point 196–198° C. (from methano/dimethylformamide);

from N-[4 - (β-<3.5 - dimethylbenzamido>-ethyl)-benzenesulfonyl]-methylurethane (melting point 223–225° C.) 4-[4 - (β - <3.5 - dimethylbenzamido>-ethyl)-benzenesulfonyl]-1.1-(2.5 - endoethylene-hexamethylene)-semicarbazide, melting point 211–213° C. (from methanol/dimethylformamide);

from N-[4-(β-<2 - ethoxy - 5 - fluorobenzamido>-ethyl)-benzenesulfonyl]-methylurethane (melting point 193–195° C.) 4-[4-(β-<2 - ethoxy - 5 - fluorobenzamido>-ethyl)-benzenesulfonyl] - 1.1 - (2.5-endoethylene-hexamethylene)-semicarbazide, melting point 161–163° C. (from methanol);

from N-[4-(β-<-ethoxy-5-acetylbenzamido>-ethyl)-benzenesulfonyl]-methylurethane (melting point 164–166° C.) 4-[4-(β-<2-ethoxy - 5 - acetylbenzamido>-ethyl)-benzenesulfonyl]-1.1 - (2.5 - endoethylene-hexamethylene)-semicarbazide, melting point 196–198° C. (from methanol);

from N-[4 - (β - <3 - chlorobenzamido>-ethyl)-benzenesulfonyl]-methylurethane (melting point 173–175° C.) N-[4 - (β - <3 - chlorobenzamido> - ethyl) - benzenesulfonfonyl]-N' - (decahydro-quinolino)-urea, melting point 245–247° C. (decomposition) (from methanol/dimethylformamide);

from N-[4-(β-<3 - ethoxythiophene - 2 - carbonamido>-ethyl)-benzenesulfonyl]-methylurethane (melting point 163–165° C.) N-[4-(β-<3-ethoxythiophene-2-carbonamido> - ethyl) - benzenesulfonyl] - N' - decahydroquinolino-urea, melting point 186–187° C. (from methanol/dimethylformamide);

from N-[4-(β-<2-methoxybenzamido>-ethyl)-benzenesulfonyl]-methylurethane (melting point 174–176° C.) N-[4-(β-<2 - methoxybenzamido> - ethyl) - benzenesulfonyl]-N'-decahydroquinolino-urea, melting point 205–206° C. (from methanol/dimethylformamide);

from N-[4-(β-<2-methoxy-5-chlorobenzamido>-ethyl)-benzenesulfonyl]-methylurethane (melting point 193–194° C.) N-[4-(β - 2 - methoxy - 5 - chlorobenzamido-ethyl)-benzenesulfonyl] - N'-decahydroquinolino-urea, melting point 218–219° C. (from methanol/dimethylformamide) and N-[4 - (β - <2 - methoxy - 5 - chlorobenzamido>-ethyl) - benzenesulfonyl] - N'-tetrahydroisoquinolino-urea, melting point 148–150° C. (from methanol);

from N-[4-(β-<2-methoxy-5-methylbenzamido>-ethyl)-benzenesulfonyl]-methylurethane (melting point 175–177° C.) N-[4-(β-<2-methoxy-5-methylbenzamido>-ethyl)-benzenesulfonyl]-N' - decahydroquinolino-urea, melting point 200–202° C. (from methanol/dimethylformamide) and N-[4 - (β - <2 - methoxy - 5 - methylbenzamido>-ethyl)-benzenesulfonyl] - N' - tetrahydroisoquinolino-urea, melting point 182–184° C. (from methanol/dimethylformamide);

from N-[4-(β-3-methoxy - 5 - chlorothiophene - 2-carbonamido-ethyl)-benzenesulfonyl]-methylurethane (melting point 186–188° C.) N-[4-(β-<-3-methoxy-5-chlorothiophene - 2 - carbonamido>-ethyl)-benzenesulfonyl]-N'-tetrahydroisoquinolino-urea, melting point 177–179° C. (from methanol/dimethylformamide);

from N - [4 - (β - <2 - methoxy-4-trifluoromethylbenzamido> - ethyl) - benzenesulfonyl] - methylurethane (melting point 190–192° C.) N-[4-(β-<2-methoxy-4-trifluoromethylbenzamido> - ethyl)-benzenesulfonyl]-1.1-(2.5-endoethylene-hexamethylene) - semicarbazide, melting point 172–174° C. (from methanol);

from N-[4-(β-<2-methoxy-benzamido>-ethyl)-benzenesulfonyl]-ethylurethane (melting point 144° C.) N-[4-(β-<2-methoxy-benzamido> - ethyl) - benzenesulfonyl]-N'-(3-azaspiro - [5,5] - undecyl - 3) - urea (melting point 187–188° C.);

from N-[4-(β-<2-methoxy-5-chloro-benzamido>-ethyl)-benzenesulfonyl]-methylurethane (melting point 178–179° C.) N-[4-(β-<2-methoxy-5-chloro-benzamido>-ethyl)-benzenesulfonyl]-N'-(3-azaspiro - [5,5]-undecyl-3)-urea (melting point 166–169° C.) and N-[4-(β-

<2-methoxy - 5 - chloro-benzamido>-ethyl)-benzene-sulfonyl]-N'-(N-thiomorpholyl)-urea (melting point 194–196° C.);

from N-[4-(β-<2-methoxy-5-methyl-benzamido>-ethyl)-benzenesulfonyl]-ethylurethane (melting point 166–170° C.) N-[4-(β-<2-methoxy-5-methyl-benzamido>-ethyl)-benzenesulfonyl]-N'-3 - azaspiro-[5,5]-undecyl-3)-urea (melting point 171–173° C.);

from N-[4-(β-<2-methoxy-5-fluoro-benzamido>-ethyl)-benzenesulfonyl]-ethylurethane (melting point 123° C.) N-[4-(β-<2-methoxy-5-fluoro-benzamido>-ethyl)-benzenesulfonyl]-N'-(3 - azaspiro - [5,5] - undecyl-3)-urea (melting point 173° C.);

from N - [4 - (β - benzamido - ethyl) - benzenesulfonyl]-methylurethane (melting point 186° C.) N-[4-(β-benzamido-ethyl)-benzenesulfonyl] - N' - (3 - azaspiro-[5,5]-undecyl-3)-urea (melting point 186–187° C.);

from N-[4-(β - <3 - chloro-benzamido>-ethyl)-benzenesulfonyl]-methylurethane (melting point 174–176° C.) N - [4 - (β - <3 - chloro - benzamido> - ethyl) - benzenesulfonyl]-N'-(3-azaspiro - [5,5] - undecyl-3)-urea (melting point 183–184° C.).

EXAMPLE 2

N-[4-(β-<2 - methoxy - 5 - chlorobenzamido>-ethyl)-benzenesulfonyl]-N'-(4,7 - methano - hexahydro-iso-indolino-2)-urea 12.8 grams of N-[4-(β-2-methoxy-5-chlorobenzamido-ethyl)-benzenesulfonyl]-methyl - urethane were dissolved in 150 milliliters of dioxane. While stirring 4.6 grams of N-amino-4,7-methano-hexahydro - iso-indoline were added thereto and the whole was heated to 100° C. for 1.5 hours while stirring was continued. After dioxane had been distilled off in vacuo, the residue was dissolved in dilute ammonia (1:25), filtered and acidified with dilute acetic acid. The N-[4-(β-<2 - methoxy-5-chlorobenzamido>-ethyl)-benzenesulfonyl]-N'-(4,7 - methano - hexahydro-iso-indolino-2)-urea thus obtained melted at 163–165° C. after recrystallizaton from dilute methanol/dioxane.

In an analogous manner there were obtained from the corresponding sulfonyl-urethane (1) N-[4-(β-benzamido - ethyl)-benzenesulfonyl]-N'-(4,7-methano-hexahydro-isoindolino-2)-urea, melting point 190–192° C. (from dilute methanol/dioxane);

(2) N-[4-(β-<4-chloro - benzamido>-ethyl)-benzenesulfonyl]-N'-(4,7 - methano - hexahydro-isoindolino-2)-urea, melting point 203.5–205.5° C. (from dilute methanol/dioxane);

(3) N-[4-(β - thiophene-2-carbonamido-ethyl) - benzenesulfonyl]-N'-(4,7-methano-hexahydro - isoindolino-2)-urea, melting point 229–231° C. (from dilute methanol/dioxane);

(4) N-[4-(β-<5-chloro-thiophene - 2 - carbonamido>-ethyl)-benzenesulfonyl]-N'-(4,7-endomethylene - hexahydro-isoindolino-2)-urea, melting point 173–175° C.;

(5) N-[4-(β-benzamido - ethyl) - benzenesulfonyl]-N'-(3,6-endoethylene-hexamethylene-imino) - urea, melting point 191–193° C.

We claim:

1. A benzene-sulfonyl semicarbazide of the formula

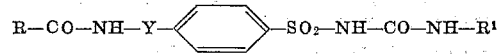

wherein

R represents (a) phenyl which may carry one or two substituents selected from the group consisting of lower alkyl, lower alkenyl, lower alkoxy, lower alkenoxy, lower alkoxyalkoxy, acetyl, halogen, trifluoro-methyl, or the methylene-dioxy group, (b) thienyl which may carry one or two substituents selected from the group consisting of halogen, lower alkyl, lower alkoxy, lower alkenyloxy, lower alkoxyalkoxy, phen-loweralkoxy, or polymethylene chain containing from 3 to 4 carbon atoms, linked at its two ends to the thienyl group, Y represents —CH$_2$—CH$_2$—, —CH$_2$—CH—(CH$_3$)— or —CH—(CH$_3$)—CH$_2$—, R$^1$ represents 4,7-endoalkylene-hexahydro-iso-indoline or 4,7-endoalkylene-tetrahydro-iso-indoline, having 1 to 2 carbon atoms in the endoalkylene group, in the case of tetrahydrocompounds the double linkage being in 5,6-position; 4,7-endocyclobutylene-hexahydro-iso-indoline; 4,7-endocyclobutylene-Δ$^5$-tetrahydro-iso-indoline; 4,7-endocyclopropylene-Δ$^5$ - tetrahydro-iso-indoline; or 4,7-endocyclopropenylene-hexahydro-iso-indoline; and salts thereof formed from pharmaceutically acceptable bases.

2. A benzene-sulfonyl semicarbazide as claimed in Claim 1, wherein R represents phenyl substituted in 2-position by lower alkoxy.

3. A benzene-sulfonyl semicarbazide as claimed in Claim 1, wherein R represents phenyl substituted in 2-position by lower alkoxy and in 4- or 5-position by halogen, lower alkyl or lower alkoxy.

4. A benzene-sulfonyl semicarbazide as claimed in Claim 1, wherein R represents phenyl substituted in 2-position by methoxy and in 5-position by halogen or methyl.

References Cited
UNITED STATES PATENTS 3,503,962   3/1970   Beregi et al. _____ 260—239.6
3,535,335   10/1970  Beregi et al. _____ 260—326.1

JOSEPH A. NARCAVAGE, Primary Examiner

U.S. Cl. X.R.

260—243 B, 283 SA, 39 BF, 326.11 R; 424—274, 258, 244